(12) United States Patent
Chen et al.

(10) Patent No.: US 9,848,053 B2
(45) Date of Patent: Dec. 19, 2017

(54) SYSTEMS AND METHODS FOR MEASURING USER ENGAGEMENT

(71) Applicant: LinkedIn Corporation, Mountain View, CA (US)

(72) Inventors: Guangde Chen, Mountain View, CA (US); Yael Garten, Mountain View, CA (US); Sarah Tolman, Mountain View, CA (US); Benjamin Arai, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 14/587,567

(22) Filed: Dec. 31, 2014

(65) Prior Publication Data

US 2015/0249716 A1    Sep. 3, 2015

Related U.S. Application Data

(60) Provisional application No. 61/946,661, filed on Feb. 28, 2014.

(51) Int. Cl.
  *G06F 15/173* (2006.01)
  *H04L 29/08* (2006.01)
(52) U.S. Cl.
  CPC .................... *H04L 67/22* (2013.01)
(58) Field of Classification Search
  CPC ........................................................ H04L 67/22
  USPC ........................................................ 709/224
  See application file for complete search history.

(56) References Cited

U.S. PATENT DOCUMENTS

| | | | |
|---|---|---|---|
| 9,021,361 B1* | 4/2015 | Pettinati | G06Q 30/00 715/736 |
| 9,654,648 B2* | 5/2017 | Sharma | H04M 15/8061 |
| 2002/0138582 A1* | 9/2002 | Chandra | G06Q 10/107 709/206 |
| 2013/0041976 A1* | 2/2013 | Hendricks | G06Q 30/02 709/217 |
| 2014/0075004 A1* | 3/2014 | Van Dusen | H04L 41/04 709/223 |
| 2015/0161255 A1* | 6/2015 | Battle | G06F 17/30864 707/706 |

* cited by examiner

*Primary Examiner* — SM Rahman
(74) *Attorney, Agent, or Firm* — Schwegman Lundberg & Woessner, P.A.

(57) ABSTRACT

Techniques for measuring user engagement with online products and content are described. According to various embodiments, user sequence flow information is generated for a given member, based on online session log data, the user sequence flow information indicating a chronological sequence of steps and associated activities, each of the activities being any one of a product page view activity and a user action activity. The generation of the user sequence flow information may comprise grouping one or more sequential page views of a product described in the online session log data for the member into a product page view activity in the user sequence flow information, and grouping one or more sequential user actions performed in conjunction with a product described in the online session log data for the member into a user action activity in the user sequence flow information.

17 Claims, 10 Drawing Sheets

| INTERACTION EVENT | TIME |
|---|---|
| Page View of Product 1 | Time t1 |
| User Action A at Product 1 | Time t2 |
| User Action A at Product 1 | Time t3 |
| User Action A at Product 1 | Time t4 |
| Page View of Product 2 | Time t5 |
| Page View of Product 2 | Time t6 |
| User Action A at Product 2 | Time t7 |
| User Action B at Product 2 | Time t8 |
| User Action C at Product 2 | Time t9 |
| Page View of Product 3 | Time t10 |
| Page View of Product 4 | Time t11 |
| User Action D at Product 4 | Time t12 |
| User Action D at Product 4 | Time t13 |
| Drop-off | Time t14 |

300

| ACTIVITY | STEP |
|---|---|
| Page View of Product 1 | Step 1 |
| User Action A at Product 1 | Step 2 |
| Page View of Product 2 | Step 3 |
| User Action A at Product 2 | Step 4 |
| User Action B at Product 2 | Step 5 |
| User Action C at Product 2 | Step 6 |
| Page View of Product 3 | Step 7 |
| Page View of Product 4 | Step 8 |
| User Action D at Product 4 | Step 9 |
| Drop-off | Step 10 |

SYSTEMS AND METHODS FOR MEASURING USER ENGAGEMENT

CROSS-REFERENCE TO RELATED APPLICATIONS

This application claims the priority benefit of U.S. Provisional Application No. 61/946,661, filed Feb. 28, 2014, which is incorporated herein by reference in its entirety.

TECHNICAL FIELD

The present application relates generally to data processing systems and, in one specific example, to techniques for measuring user engagement with online products and content.

BRIEF DESCRIPTION OF THE DRAWINGS

Some embodiments are illustrated by way of example and not limitation in the figures of the accompanying drawings in which:

FIG. 3 is a flowchart illustrating an example of user session log data and user sequence flow information for a given user, according to various embodiments;

DETAILED DESCRIPTION

Figure 1:
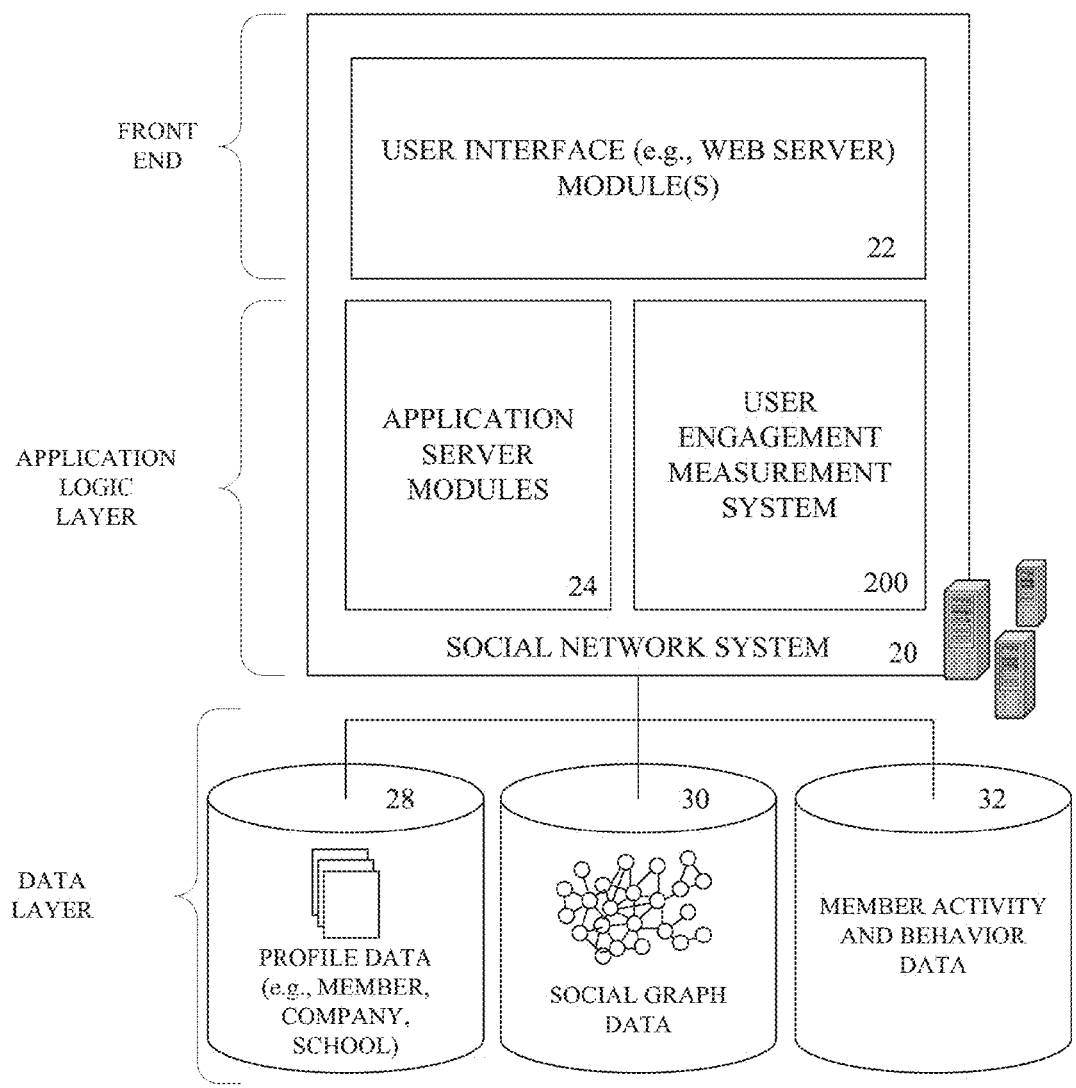
FIG. 1 is a block diagram showing the functional components of a social networking service, consistent with some embodiments of the invention.

Example methods and systems for measuring user engagement with online products and content are described. In the following description, for purposes of explanation, numerous specific details are set forth in order to provide a thorough understanding of example embodiments. It will be evident, however, to one skilled in the art that the present invention may be practiced without these specific details.

According to various example embodiments, a user engagement measurement system 200 is configured to utilize various techniques to measure user engagement on a website. For example, for simple websites such as a news website or a search engine website, user engagement is often determined by simply measuring how many times the website has been viewed or how many search queries are performed via the website. However, for more intricate websites such as LinkedIn, which feature a variety of products (offering richer functionality and greater value propositions), a conventional approach of simply counting a number of page views or search queries may not be sufficient for the purposes of understanding or measuring engagement with such websites.

Accordingly, various embodiments described herein provide a methodology for measuring user engagement in a more meaningful manner, such that the user engagement measurement system 200 can measure far more than simply page views or clicks, for example. In particular, there is provided a methodology that enables the user engagement measurement system 200 to group products of the website together, and to measure the number of products the user is using or "touching", as well as the sequence or flow in which products are touched, and the user actions that the user is taking with respect to each product. Thus, product managers and other personnel associated with the website viewing these flows generated by the user engagement measurement system 200 may understand how many products each user is touching, the flow in which these products are touched, the actions taken in conjunction with each product, and so on, and not just simply how many page views are occurring. Thus, website personnel are provided with more effective tools to better understand user interaction and engagement with a website.

According to various example embodiments, the user engagement measurement system 200 provides tools to understand user navigation throughout various products of a website (e.g., an online social network service such as LinkedIn), and the flows representing what actions users are taking with respect to each product. Thus, the user engagement measurement system 200 may determine whether, when users visit LinkedIn, for example, are they funneling into a particular product such as the search page or the inbox, and once the users have reached this product, the user engagement measurement system 200 may determine whether they tend to perform a particular user action, such as sending out invitations. Thus, the user engagement measurement system 200 may provide information about the products they are consuming, actions they are performing, and the flows describing the sequence in which they are consuming these products and performing these actions. The embodiments herein provide an extremely rich technique to perform funnel analysis (e.g., the study of how users transition from one screen to the next and where they drop off) that incorporates all of the products available on a website (e.g., LinkedIn), and the actions that people can take with respect to these products, wherein the user engagement measurement system 200 may associate certain value to each of those actions.

According to various example embodiments, the user engagement measurement system 200 is configured to analyze user log data in order to generate user sequence flow information, which represents a user session and consists of a sequence of activities in the order they are performed by the user. Each activity corresponds to a product page view activity by a user (e.g., a page view of a particular webpage associated with given product), or a user action activity by the user (e.g., liking, commenting, sharing, clicking on content, sending invitations, etc.). Moreover, in some embodiments, an activity may include a sequential grouping of similar page views of the same product (e.g., page views on the same webpage or group of webpages, also referred to herein as a page key product group) or a sequential grouping of similar actions taken with respect to a similar product. Thus, if a user performs multiple sequential page views of a given product, these page views may be grouped into a single product activity associated with that given product. For example, in FIG. 4, the user has performed 2 sequential similar page views 401, 402 of the Home Page product, and these page views 410, 402 may be grouped into a single product page view activity 410 associated with the Home Page product. Moreover, if a user performs multiple sequential similar actions with respect to a given product, these actions may be grouped into a single action activity associated with that given product. For example, in FIG. 4, the user has performed 2 sequential similar actions (a like of network update stream (NUS) content) 403, 404 of the Home Page product, and these like actions 403, 404 may be grouped into a single action activity 411 associated with the Home Page product. The resulting sequence flow thus represents a series of sequential steps indicating the products accessed by the user, and the actions the user takes with respect to those products, in the order that they occur.

The products described herein may include any online products associated with a website. For example, each of the products may be associated with (or correspond to) separate features, aspects, embodiments, functionality, options, webpages, and so on, associated with a website of an online social networking service website. For example, the LinkedIn online social networking service includes various products such as the homepage product, the network update stream (NUS) or content feed product, the people you may know (PYMK) product, the groups product, the jobs product, the influencer product, the schools/universities product, the profile (viewing) product, the profile (editing) product, the search product, the address book product, the contacts product, a jobs page, a company page, and so on.

Moreover, the user actions described herein may be any one of various actions that may be performed by user in conjunction with each of the products. Examples of user actions include profile editing, social gestures such as liking, commenting, sharing, etc., performing a search, sending a message, receiving a message, sending an invite request (e.g., a friend or member connection request), accepting an invite request, an address book upload (where people upload their address book to the online social networking service and invitations are transmitted to their address book contacts to invite them to join the online social networking service), and so on. Each action may be performed with respect to various products. In other words, there are certain actions that can be performed on multiple products. For example, sending a member to member invitation may be performed from the "People You May Know" (PYMK) product, or an address book import product, or a profile product, or a variety of other products.

The techniques described herein allow website personnel to break page views into product, and to analyze not just products visited, but also the intensity of interaction within the products (e.g., based on how many user actions are grouped together into a user action activity). This is in contrast to conventional techniques where website personnel may notice in some cases that there were a lot of page views in connection with a particular product or feature, but they were unsure of how to quantify these page views (e.g., in terms of whether it was that individual person's interest in the product, or whether it was just this particular type of product generating a lot of page views, etc.).

The techniques described herein may be helpful not only for a desktop computing platform, but also for mobile and other computing platforms, by allowing website personnel to better understand what users are engaging with and how much they're engaging with it. For example, the user engagement measurement system 200 allows website personnel to determine that people are sliding through different mobile navigation interfaces on a social network app on their mobile merely in order to funnel into their content feed. Thus, the user engagement measurement system 200 allows an analysis of not simply the products users are visiting, but also all what actions users are taken with respect each of these products.

According to various example embodiments, the user engagement measurement system 200 may utilize user sequence flow information for the purposes of product enhancements. For example, the user engagement measurement system 200 may determine that, for example, in 20% of all sessions on mobile, users basically funnel toward their inbox. So if the user engagement measurement system 200 determines that it takes them six clicks to get there, the user engagement measurement system 200 may flag or alert website personnel so that steps can be taken to change this (e.g., by bubbling the inbox up and putting the user interface element for accessing it via one click in the entry point of the LinkedIn ecosystem). This reduces friction and increases engagement. As another example, the user engagement measurement system 200 may determine the type of activity that people want to do when they're on their mobile device, so that a mobile application may be changed according to that data.

Another example of the functionality of the user engagement measurement system 200 is that, if the user engagement measurement system 200 determines that a lot of users are dropping off at a certain point, efforts may be taken to keep them engaged in the websites offerings and not have them drop off, and thus website offerings may be optimize. Thus, the system may raise a call to action if it detects a certain drop off point, and website personnel may start experimenting with different types of activities to draw the user back into the website. Ultimately, the more engaged users are with the website and its products, the more page views, actions, etc., it will provide and the longer their session on the website, all of which benefits the entire ecosystem of the website.

According to various example embodiments, the techniques described herein may be utilized to group products by themselves (e.g., products that the user has touched) and actions by themselves (e.g., user actions that the user has taken), in order to determine users initial intent versus secondary intent with respect to various products and user actions. For example, the user engagement measurement system 200 may determine what was the first product they utilized or the first user action they took, and thus what was their initial intent (e.g., what users are coming to the website to do first), as well as what was the second product they utilized or what was the second action they took, and thus what was their secondary intent, and so on. The user engagement measurement system 200 may repeat this process for individual users or a combination of users. For example, suppose a first user visits the homepage of the website and submits 10 likes, whereas a second user visits the homepage and performs an address book upload, the user engagement measurement system 200 will be able to group those together and compare them across the member base of the websites.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

With some embodiments, the social network system 20 includes what is generally referred to herein as a user engagement measurement system 200. The user engagement measurement system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
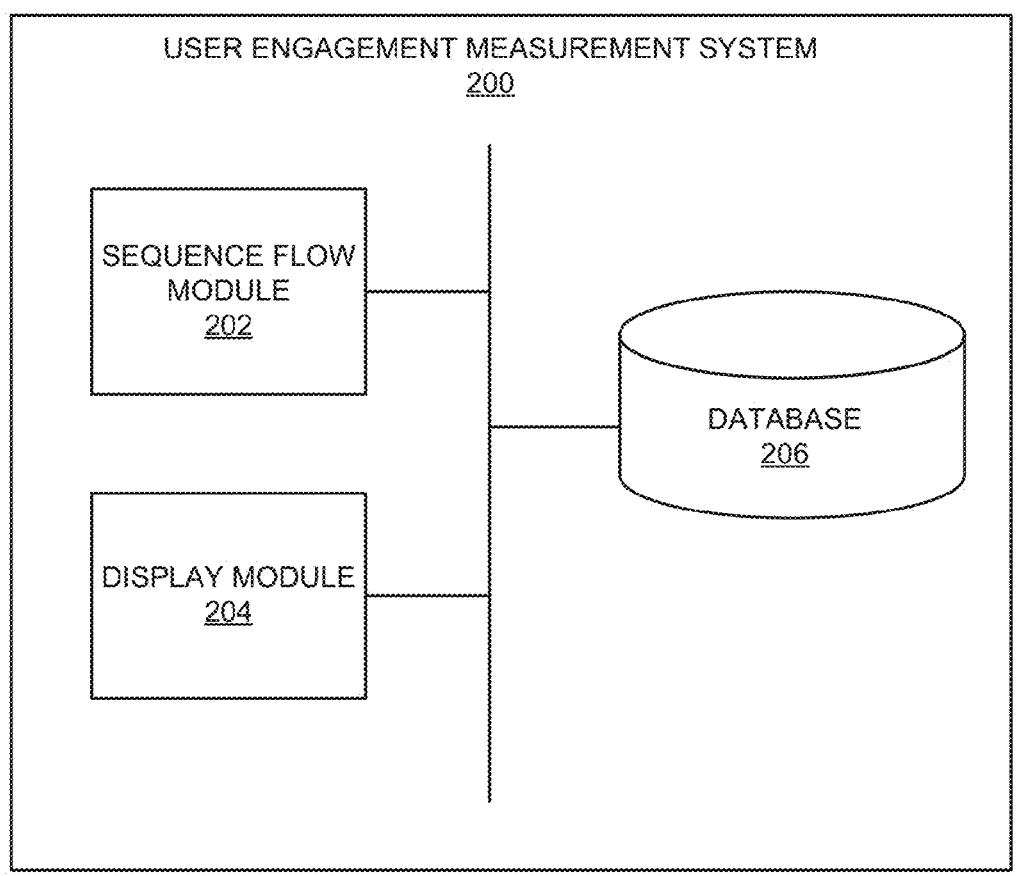
FIG. 2 is a block diagram of an example system, according to various embodiments.

Turning now to FIG. 2, a user engagement measurement system 200 includes a sequence flow module 202, a display module 204, and a database 206. The modules of the user engagement measurement system 200 may be implemented on or executed by a single device such as a user engagement measurement device, or on separate devices interconnected via a network. The aforementioned user engagement measurement device may be, for example, a client machine or application server. The operation of each of the aforementioned modules of the user engagement measurement system 200 will now be described in greater detail below.

The sequence flow module 202 is configured access online session log data associated with a set of members of an online social network service, the online session log data indicating, for a given member, a chronological sequence of page views of the products by the member and user actions performed by the member in conjunction with the products of the online social network service. For example, FIG. 3 illustrates an example of online session log data 300 for a given member, that list a chronological sequence of page views of the products by the member (e.g., "Page View of Product 1 at Time t1") and user actions performed by the member in conjunction with the products of the online social network service (e.g., "User Action B at Product 2 at Time T8"). As described herein, each of the products (e.g., P1, P2, P3) may be associated with a particular webpage. Alternatively, each of the products (e.g., P1, P2, P3) may actually represent a logical grouping of products. For example, each of the products (e.g., P1, P2, P3) may actually correspond to a predefined group of products, such as a "page key product group" that specifies multiple webpages associated with a related group of products, such as member profile products (e.g., member profile page, edit profile page for editing member profile, another member's profile page, etc.). As described herein, references to a user action being performed in conjunction with the particular product may correspond to the user submitting a command/request to perform that user action from a webpage associated with that product (e.g., by selecting a user interface element or button displayed on that webpage). The user action activities described herein (e.g., User Action A, User Action B) may correspond to individual user actions, such as likes, or may correspond to a predefined group of actions. Thus, the embodiments described herein make it easier to compare different sessions and the actions therein. For example, the sequence flow module 202 may group together actions such as "like" and "address book upload", so when two different flows are compared, the system can actually compare what grouped actions happen within those flows. Thus, an efficient and useful way of comparing different sessions, and flows that occurred therein, is provided.

The user session log data 300 also includes a drop-off event indicating the end of the user session. For example, if the user selects a "log-off" button, or closes a browser, or if a predetermine time has elapsed since the user's last activity on the site (e.g., user Action D at Product 4 at time t13), then a drop-off event may be inserted into the user session log data 300 by the user engagement measurement system 200 or another system generating the user session log data.

The sequence flow module 202 is also configured to generate, for a given member, based on the online session log data, user sequence flow information indicating a chronological sequence of steps and associated activities, each of the activities being any one of a product page view activity and a user action activity. For example, FIG. 3 illustrates an example of user sequence flow information 301 for a given member that is generated based on the online session log data 300 for the given member. The user sequence flow information 301 indicates a chronological sequence of steps and an associated activity performed by the user at each step. For example, step 1 represents the first activity performed by the user once they begin their online session on the online social networking service, step 2 represents the next activity after the first activity in step 1, step 3 represents the next activity after step 2, and so on. As illustrated in FIG. 3, each of the activities in the user sequence flow information 301 is either a product page view activity (e.g., "Page View of Product 1") or a user action activity (e.g., "User Action B at Product 2"). A drop-off user action activity may also be inserted into the corresponding user sequence flow information 301 by the user engagement measurement system 200.

Moreover, as illustrated in FIG. 3, the sequence flow module 202 has generated the user sequence flow information 301 by grouping one or more sequential user actions performed in conjunction with one of the products of the online social networking service, as described in the online session log data 300 for the member, into a user action activity in the user sequence flow information 301. For example, the sequence flow module 202 has combined the user actions A (e.g., likes) performed conjunction with product 1 (e.g., a content feed) at times t2, t3, and t4, into a single user action activity ("User Action A at Product 1" at Step 2). Moreover, as illustrated in FIG. 3, the sequence flow module 202 has generated the user sequence flow information 301 by grouping one or more sequential page views of a product of the online social networking service, as described in the online session log data 300 for the member, into a single product page view activity in the user sequence flow information 301. For example, the sequence flow module 202 has combined the page views of product 2 (e.g., a jobs page) at times t5 and t6, into a single product page view activity ("Page View of Product 2" at Step 3,).

Figure 4:
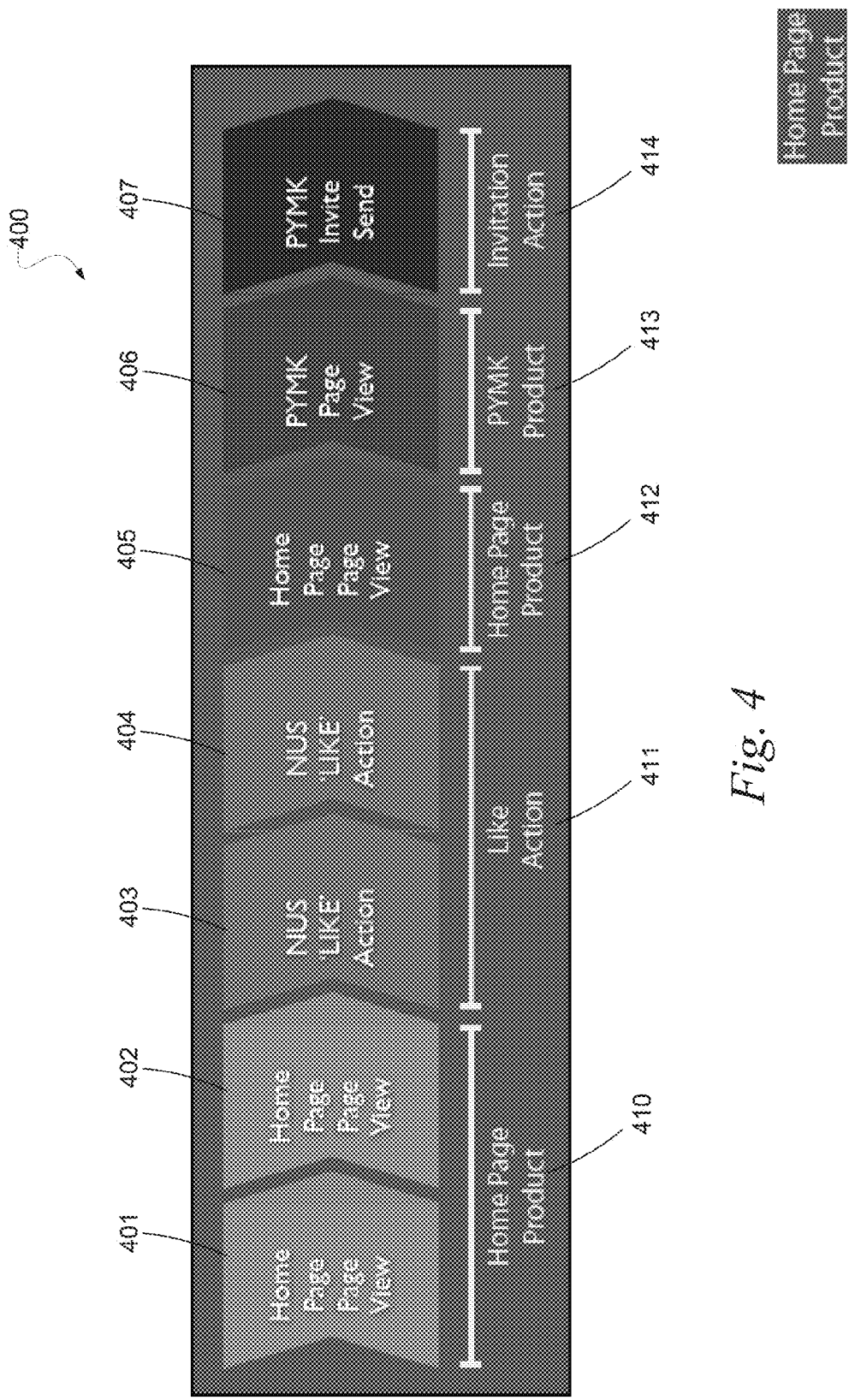
FIG. 4 illustrates an example of a visual representation of user sequence flow information, according to various embodiments.

Thereafter, the display module 204 of the system 200 is configured to display, via a user interface, a visual representation of the user sequence flow information generated by the sequence flow module 202. The visual representation of the user sequence flow information depicts the chronological sequence of steps and the associated activities of the user sequence flow information. For example, FIG. 4 illustrates a user interface 400 that may be displayed by the display module 204, where the user interface 400 includes a visual representation of the user sequence flow information for a given user. For example, the user interface 400 includes a series of steps 410-414 that are each associated with a particular activity, including a product page view activity of the homepage product 410, the user action activity of a like action 411 in conjunction with a network update stream (NUS) product, a product page view activity associated with the homepage product 412, a product page view activity associated with a people you may know (PYMK) product 413, and a user action activity of sending an invitation request in conjunction with a people you may know (PYMK) product 414. While the activities 412-414 are be associated with individual events 405-407 in the underlying user session log data, it can be seen that the product page view activity 410 actually includes a grouping of multiple sequential page views (401 and 402) of the homepage product. Similarly, the user action activity 411 actually includes a grouping of multiple sequential user actions (403 and 404) corresponding to multiple sequential "likes" of content in the NUS product. Thus, the user sequence flow information indicates the order in which products have been accessed and the order in which user actions have been submitted with respect to each of the products. (In contrast, the traditional approach to measuring user engagement simply involves logging the number of page views at each of these webpages.)

Figure 5:
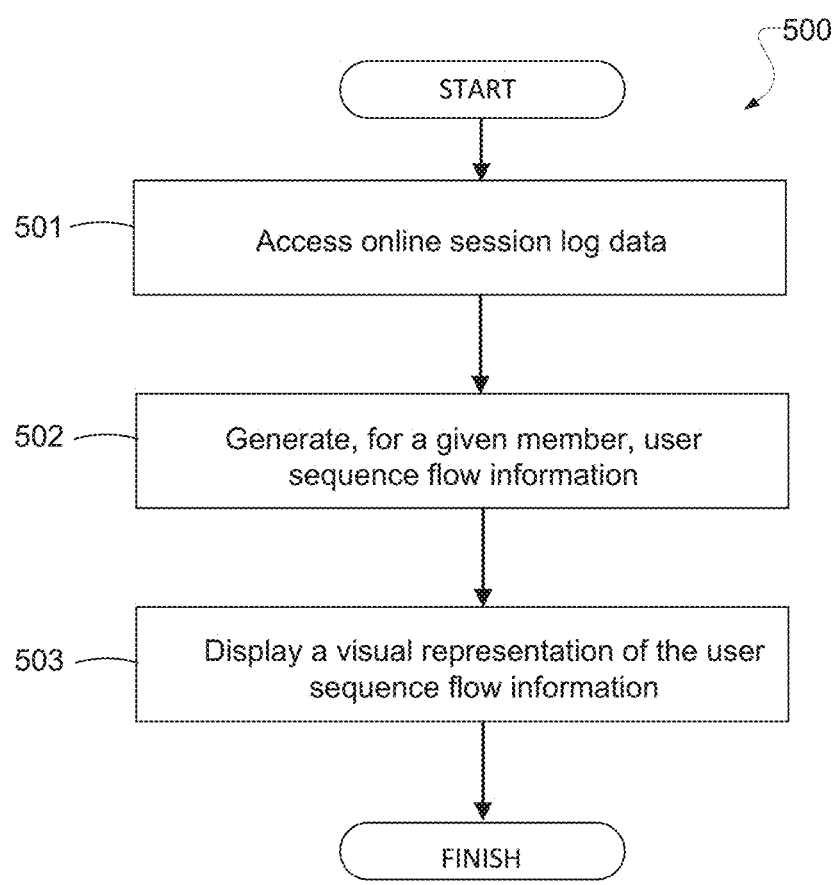
FIG. 5 is a flowchart illustrating an example method, according to various embodiments.

FIG. 5 is a flowchart illustrating an example method 500, consistent with various embodiments described herein. The method 500 may be performed at least in part by, for example, the user engagement measurement system 200 illustrated in FIG. 2 (or an apparatus having similar modules, such as one or more client machines or application servers). In operation 501, the sequence flow module 202 accesses online session log data associated with a set of members of an online social network service, the online session log data indicating, for a given member, a chronological sequence of page views of the products by the member and user actions performed by the member in conjunction with the products of the online social network service.

In operation 502, the sequence flow module 202 generates, for the given member, based on the online session log data accessed in operation 501, user sequence flow information indicating a chronological sequence of steps and associated activities, each of the activities being any one of a product page view activity and a user action activity. The user sequence flow information may be generated by grouping one or more sequential page views of one of the products described in the online session log data for the member (accessed in operation 501) into a product page view activity in the user sequence flow information, and grouping one or more sequential user actions performed in conjunction with one of the products described in the online session log data for the member (accessed in operation 501) into a user action activity in the user sequence flow information In operation 503, the display module 204 displays, via a user interface, a visual representation of the user sequence flow information generated in operation 502, the visual representation of the user sequence flow information depicting the chronological sequence of steps and the associated activities in the user sequence flow information (e.g., see FIG. 4).

In some embodiments, the sequence flow module 202 may access the user session log information (and generate corresponding user sequence flow information) for user interactions associated with a particular context. For example, the particular context may reference online sessions associated with a particular device type (e.g., desktop, mobile device, tablet device, etc.), a particular operating system type (e.g., android, IOS, etc.), a particular time (e.g., weeknights during the month of June 2001), a particular geographic location (e.g., USA), or a particular session-type corresponding to an organic session type or a transactional session type. The organic session type described above may correspond to cases where the user visits an online social networking service without any external push or nudge (e.g., when the user opens a mobile application associated with the online social networking service, or the user types in a uniform resource locator (URL) associated with a homepage of the online social network service into their web browser in order to visit the homepage of the online social network service). In contrast, the transactional session type described above is when the user enters into the online social networking service due to some external prodding (e.g., by selecting the link in an e-mail, message, or push notification transmitted to the user). Thus, the user engagement measurement system 200 may generate the user sequence flow information and the various visual representations described herein for any given context as described above. The display module 204 may display the user interface configured to receive a user specification of context information describing a particular context, and the sequence flow module 202 to may access online session log data associated with that particular context, in order to generate user sequence flow information and visual representations as described herein.

According to various example embodiments, the user engagement measurement system 200 may combine a plurality of user sequence flow information for a plurality of members, and generate a user funneling diagram representing the combined user sequence flow information for the plurality of members. For example, the display module 204 may access the user sequence flow information 301 in FIG. 3 for multiple members, and generate a combined data record in a database indicating, at a given step (e.g., "Step 1"), the activities performed by each member at that given step. The display module 204 may then generate the funneling diagrams illustrated in FIGS. 6 and 7.

Figure 6:
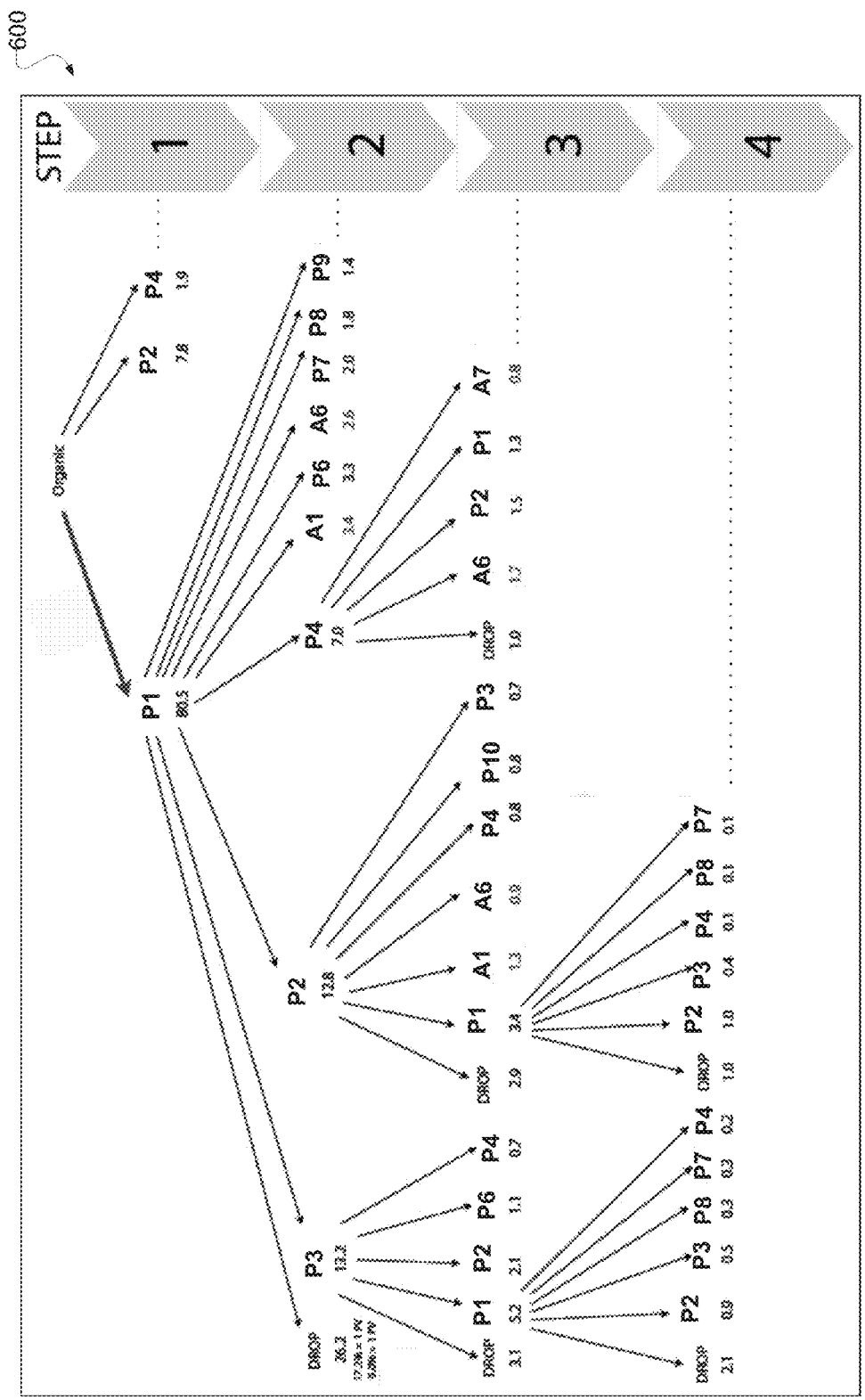
FIG. 6 illustrates an example portion of a funneling diagram, according to various embodiments.
Figure 7:
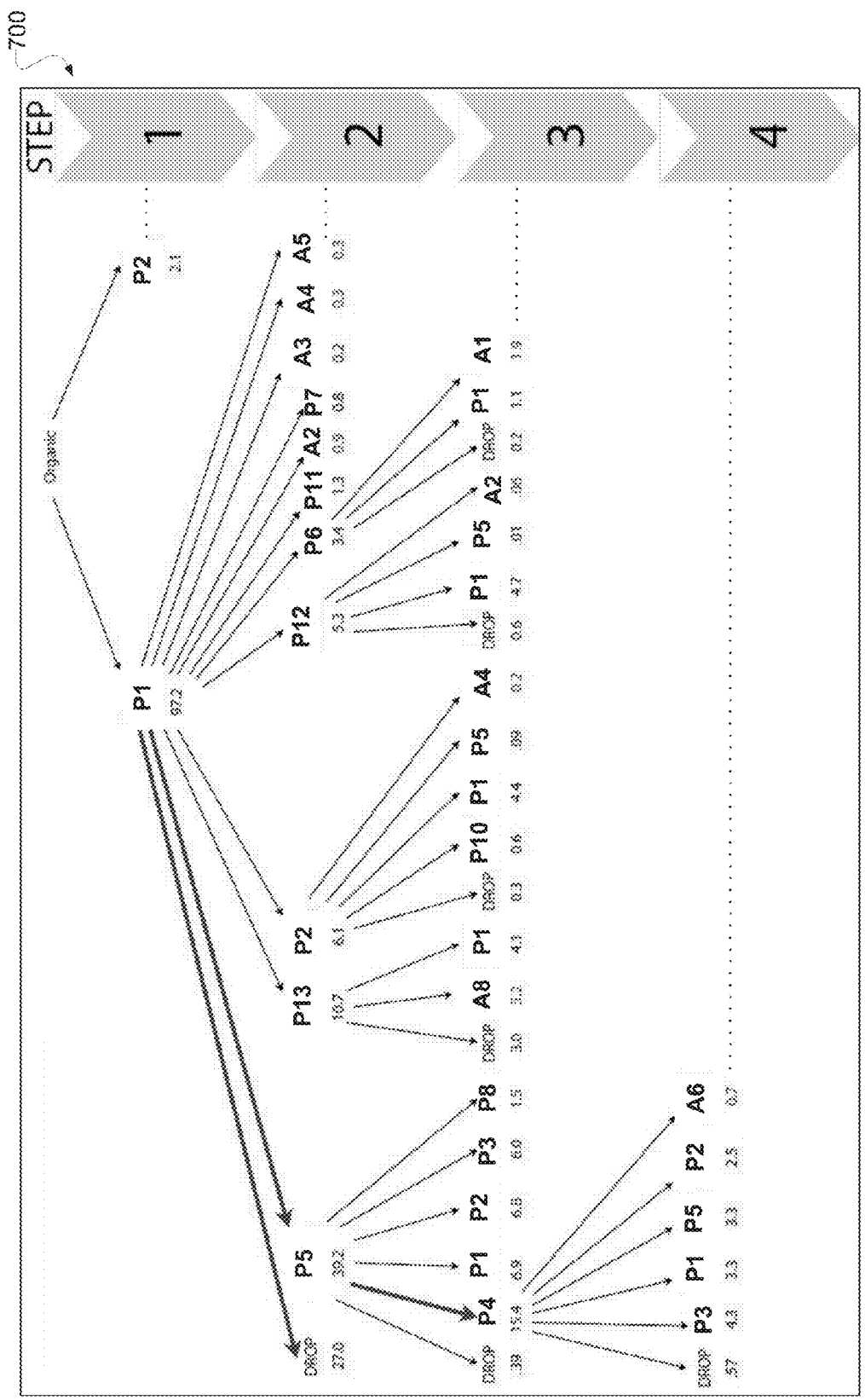
FIG. 7 illustrates an example portion of a funneling diagram, according to various embodiments.

As illustrated in FIGS. 6 and 7, the funneling diagrams 600 and 700 includes a list of sequential steps 1, 2, 3, and 4 on the right, and one or more activities (either product page view activities of products P1-P13 or user action activities A1-A8) that the members have taken at each step. As described in more detail below, the funneling diagrams 600 and 700 include arrows extending from activities in one step to activities in a subsequent step, as well as percentages for each activity, in order to illustrate how (and how many) users funnel or flow from a given activity at a given step to another activity at another step. More specifically, the funneling diagrams 600 and 700 include arrows connecting a first activity in a first step to a second activity in a second step, in order to indicate the path taken by members (e.g., performing the first activity at the first step, followed by the second activity at the second step), and each activity displays a percentage of the relevant user sessions that reach this point and perform that activity (i.e., that view that product or perform that user action).

For example, with reference to FIG. 6, 3 activities are displayed in conjunction with Step 1 in FIG. 6, indicating that 80.5% of sessions include a product P1 page view activity at Step 1, 7.8% of user sessions include a product P2 page view activity at Step 1, and so on. Moreover, lines extend from the product P1 page view activity at Step 1 to various activities at Step 2, and the percentages of such activities indicate how many sessions include the product P1 page view activity at Step 1 followed by the given activity at Step 2. For example, 13.2% of sessions include a product P1 page view activity at Step 1, followed by a product P3 page view activity at Step 2, whereas 3.4% of sessions include a product P1 page view activity at Step 1, followed by a user action A1 activity at Step 2, and so on.

Similarly, FIG. 7 displays another funneling diagram 700. In some embodiments, each of funneling diagrams 600 and 700 may be associated with a different context. For example, funneling diagram 600 is associated with organic-type sessions on a desktop computing device for a given time interval, whereas funneling diagram 700 is associated with organic-type sessions on an Android mobile computing device for a given time interval. Similarly, the system 200 may generate other funneling diagrams associated with other contexts.

Thus, the display module 204 may generate the funneling diagrams by identifying, for each specific step in the combined user sequence flow information, and for each preceding activity in the preceding step in the combined user sequence flow information, a percentage of the combined user sequence flow information that identify a given activity (or a drop-off activity) at the specific step subsequent to the preceding activity in the preceding step. Such percentages may then be displayed in conjunction with each activity in the funneling diagrams. For example, with reference to FIG.

6, for Step 2, and for the product P1 page view event at Step 1, the display module 204 may determine that 12.8% of the user sequence flow information for the relevant members indicates the product P1 page view event at Step 1, followed by the product P2 page view event at Step 2, whereas 26.2% of the user sequence flow information for the relevant members indicates the product P1 page view event at Step 1 followed by a drop-off activity ("DROP") at Step 2, and so on.

Figure 8:
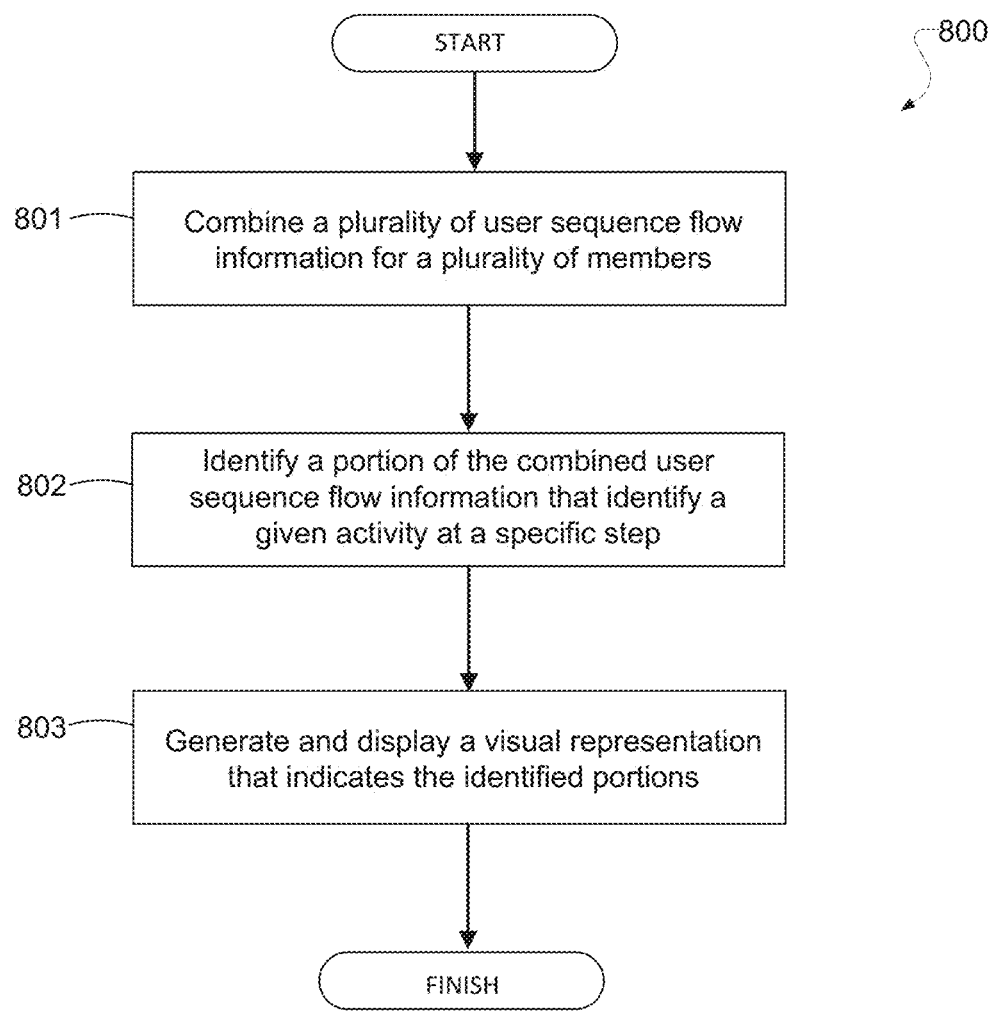
FIG. 8 is a flowchart illustrating an example method, according to various embodiments.

FIG. 8 is a flowchart illustrating an example method 800, consistent with various embodiments described herein. The method 800 may be performed at least in part by, for example, the user engagement measurement system 200 illustrated in FIG. 2 (or an apparatus having similar modules, such as one or more client machines or application servers). The method 800 may be performed after user sequence flow information for one or more members is generated (e.g., consistent with method 500 described in FIG. 5). In operation 801, the sequence flow module 202 combines a plurality of user sequence flow information for a plurality of members. In operation 802, the sequence flow module 202 identifies, for each specific step in the combined user sequence flow information, and for each preceding activity in the preceding step in the combined user sequence flow information, a portion or percentage of the combined user sequence flow information that identify a given activity at the specific step subsequent to the preceding activity in the preceding step. In some embodiments, the given activity may be a drop-off user action activity. In operation 803, the display module 204 generates and displays a visual representation that indicates, for each specific step in the combined user sequence flow information, and for each preceding activity in the preceding step in the combined user sequence flow information, the portions or percentages identified in operation 802. It is contemplated that the operations of method 800 may incorporate any of the other features disclosed herein. Various operations in the method 800 may be omitted or rearranged, as necessary.

As described herein, the display module 204 is configured to help user identify various insights into user engagement with products of an online social network service. For example, with reference to the funneling diagram 600 in FIG. 6, it can be seen that product P1 is the primary entry-point for that context (desktop organic sessions), since ~80% of all organic sessions start from product P1. Similarly, it can be seen in FIG. 7 that approx. ~15% of Members funnel into product P4 via product P1 and product P5, whereas ~3.4% funnel into product P6 via product P1, and so on. Thus, for each step, the display module 204 may identify and flag any activities associated with large percentages (e.g., larger than a predetermined percentage, or large in relation to the other percentages for activities at that stage or at all stages). The display module 204 may generate and display, via a user interface, a report indicating the flagged activities, and the preceding activities at the preceding stages leading up to this flagged activity (e.g., the report may state "~15% of Members funnel into product P4 at Step 3 via product P1 in Step 1 and product P5 at Step 2"). Thus, users viewing the report may understand where members start their sessions in a given context, how the users funnel into given products.

Further, for each step, the display module 204 may identify and flag any drop-off activities associated with large percentages (e.g., larger than a predetermined percentage, or large in relation to the other percentages for activities at that stage or at all stages). For example, it can be seen in FIG. 6 that ~26% of sessions in that context (desktop organic sessions) include drop event immediately following a product P1 page view, while in FIG. 7, ~27% of sessions in that context (Android app sessions) include drop event immediately following a product P1 page view. Thus, the display module 204 may generate and display, via a user interface, a report indicating the flagged drop-off activity (and the preceding activities at the preceding stages leading up to this flagged drop-off activity). Thus, users viewing the report may understand how members end their sessions.

In some embodiments, the display module 204 may identify how many users funnel into a given product (or user action) at all stages in the user sequence flow information for a given context. For example, it can be seen in FIG. 7 that approx. ~11% of members funnel into product P3 (~6% at Step 3 and ~4.3% at Step 4). Thus, the display module 204 may generate a report identifying various products (or user actions) and the percentage of members that funnel into that product (or user action) at all stages in the user sequence flow information.

In some embodiments, the display module 204 may identify how actions are taken in conjunction with a given product, either at a specific stage, or at any stage in the user sequence flow information for a given context. For example, it can be seen in FIG. 7 that relatively few sessions take an action on product P1 (user action A2=0.9%, user action A3=0.2%, user action A4=0.3%, user action A5=0.3%, etc., at step 2). Thus, the display module 204 may generate a report identifying various products and the percentage of members that perform actions after visiting that product at any stage in the user sequence flow information. The display module 204 may flag high or low percentages in the report.

In some embodiments, the user engagement measurement system 200 may identify a lack of actions taken on products within flows for a given context. For example, the user engagement measurement system 200 may analyze a user sequence flow in order to identify each of the activities as either a product being accessed/viewed, or an action being taken with respect to a particular product. If a product activity is followed directly by another product activity, this indicates that the user has progressed directly from a first product to a second product without taking any user action (e.g., liking, commenting, sharing, clicking on content, sending invitations, etc.) on the first product. On the other hand, if a product activity is followed directly by an action activity, this indicates that the user has accessed a product and then taken a user action (e.g., liking, commenting, sharing, clicking on content, sending invitations, etc.) with respect to the first product. Thus, the user engagement measurement system 200 may flag all instances where users did not take actions on a given product, and provide a report to a user via a user interface (e.g., a report indicating that percentage or proportion of users that did, or did not, take an action on a given product in different contexts).

In some embodiments, the user engagement measurement system 200 may generate and display a report indicating an average, median or mode number of products viewed per session for a given context. In some embodiments, the user engagement measurement system 200 may generate and display a report indicating an average, median or mode number of user actions performed per session for a given context.

Example Mobile Device

Figure 9:
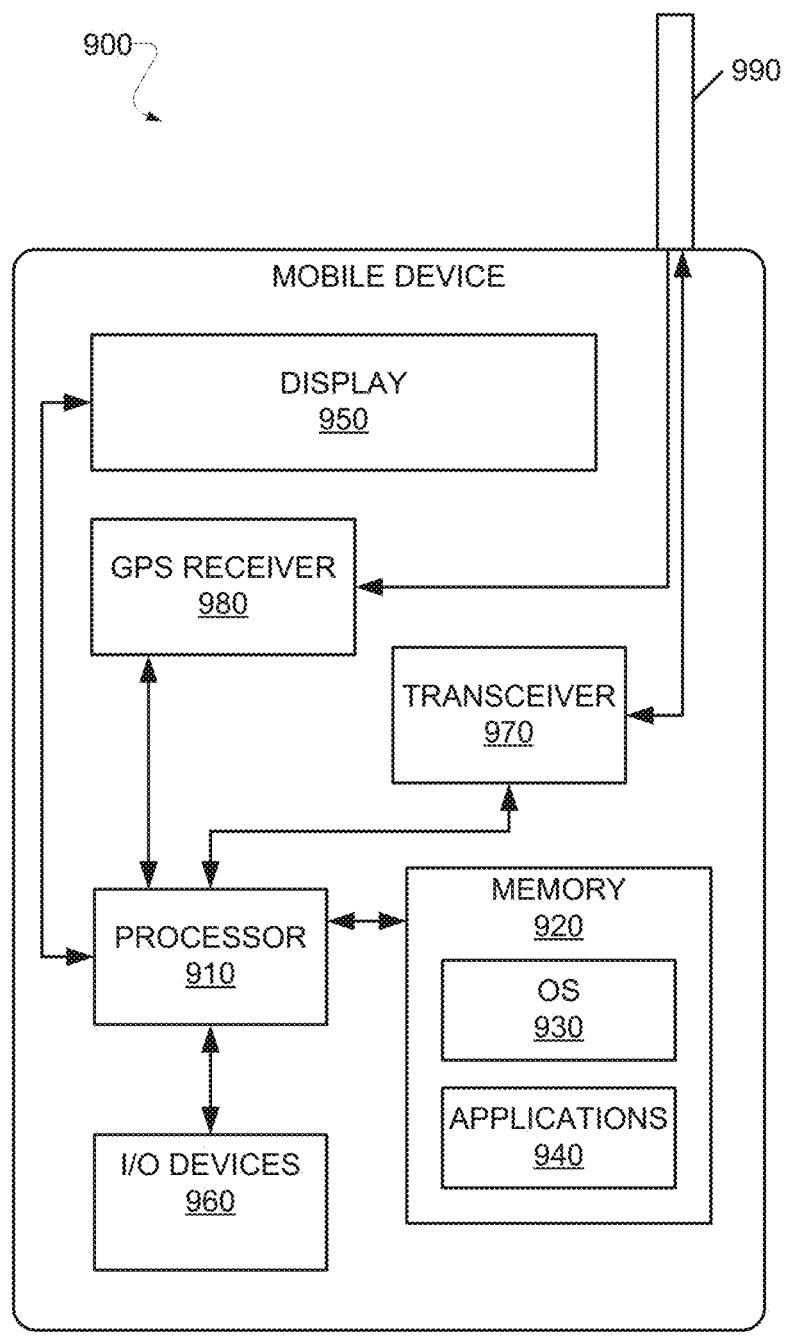
FIG. 9 illustrates an example mobile device, according to various embodiments.

FIG. 9 is a block diagram illustrating the mobile device 900, according to an example embodiment. The mobile device may correspond to, for example, one or more client machines or application servers. One or more of the modules of the system 200 illustrated in FIG. 2 may be implemented on or executed by the mobile device 900. The mobile device 900 may include a processor 910. The processor 910 may be any of a variety of different types of commercially available processors suitable for mobile devices (for example, an XScale architecture microprocessor, a Microprocessor without Interlocked Pipeline Stages (MIPS) architecture processor, or another type of processor). A memory 920, such as a Random Access Memory (RAM), a Flash memory, or other type of memory, is typically accessible to the processor 910. The memory 920 may be adapted to store an operating system (OS) 930, as well as application programs 940, such as a mobile location enabled application that may provide location based services to a user. The processor 910 may be coupled, either directly or via appropriate intermediary hardware, to a display 950 and to one or more input/output (I/O) devices 960, such as a keypad, a touch panel sensor, a microphone, and the like. Similarly, in some embodiments, the processor 910 may be coupled to a transceiver 970 that interfaces with an antenna 990. The transceiver 970 may be configured to both transmit and receive cellular network signals, wireless data signals, or other types of signals via the antenna 990, depending on the nature of the mobile device 900. Further, in some configurations, a GPS receiver 980 may also make use of the antenna 990 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
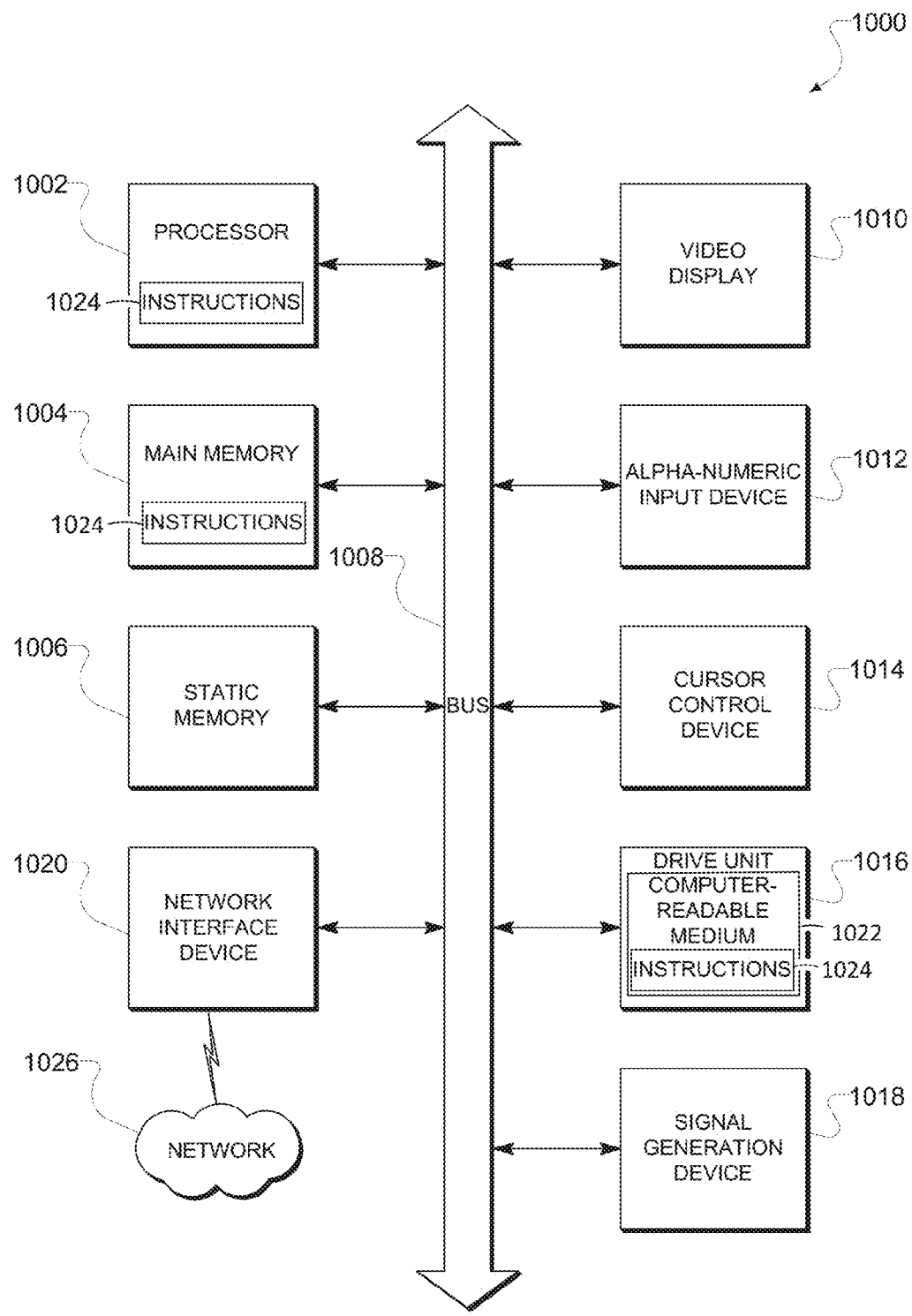
FIG. 10 is a diagrammatic representation of a machine in the example form of a computer system within which a set of instructions, for causing the machine to perform any one or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
accessing online session log data associated with a set of members of an online social network service (OSNS), the online session log data indicating, for a given member of a plurality of members of the OSNS, a chronological sequence of page views of products by the given member and user actions performed by the given member in conjunction with the products of the OSNS;
generating, using one or more hardware processors, for the given member, based on the online session log data, user sequence flow information indicating a chronological sequence of steps and activities associated with the given member, each of the activities being at least one of a product page view activity or a user action activity associated with the given member, the chronological sequence of steps and activities including one or more specific steps and activities and one or more preceding steps and activities, the one or more specific steps and activities being subsequent to the one or more preceding steps and activities, the generating further comprising:
grouping one or more sequential page views of one of the products described in the online session log data for the given member into a product page view activity in the user sequence flow information associated with the given member, the one or more sequential page views being by the given member, and
grouping one or more sequential user actions performed in conjunction with one of the products described in the online session log data for the given member into a user action activity in the user sequence flow information associated with the given member, the one or more sequential user actions being performed by the given member;
combining a plurality of user sequence flow information for the plurality of members;
identifying, for each specific step in the combined user sequence flow information, and for each preceding activity in a preceding step in the combined user sequence flow information, a portion of the combined user sequence flow information that identify a given activity at the specific step subsequent to the preceding activity in the preceding step; and
generating, and displaying, in a user interface, a visual representation that indicates, for each specific step in the combined user sequence flow information, and for each preceding activity in the preceding step in the combined user sequence flow information, the identified portions.

2. The method of claim 1, further comprising receiving, via the user interface, a user specification of context information describing a particular context;
wherein the accessing further comprises accessing online session log data describing user sessions associated with the particular context.

3. The method of claim 2, wherein the context information indicates online sessions associated with a particular device type, a particular operating system type, a particular time, a particular geographic location, or a particular session-type corresponding to an organic session type or a transactional session type.

4. The method of claim 1, wherein the products include at least one of a homepage, a content feed webpage, a member profile webpage, people you may know (PYMK) webpage, a who's-viewed-my-profile (WVMP) webpage, a group profile webpage, a company profile webpage, an educational institution profile webpage, an Influencer profile webpage, a jobs webpage, a news webpage, a search webpage, a profile edit webpage, or a message inbox webpage.

5. The method of claim 1, wherein the user actions include at least one of sending an invite request to a member or a guest of the OSNS, accepting an invite request, performing a profile edit task, liking content, commenting on content, sharing content, submitting a search request, sending a message, joining a group, following a company, following an Influencer, following an educational institution, applying for a job, and uploading an address book.

6. The method of claim 1, wherein the given activity is a drop-off user action activity.

7. A system comprising:
one or more hardware processors; and
a machine-readable medium for storing instructions that, when executed by the one or more hardware processors, cause the one or more hardware processors to perform operations comprising:
accessing online session log data associated with a set of members of an online social network service (OSNS), the online session log data indicating, for a given member of a plurality of members of the OSNS, a chronological sequence of page views of products by the given member and user actions performed by the given member in conjunction with the products of the OSNS;
generating, for the given member, based on the online session log data, user sequence flow information indicating a chronological sequence of steps and activities associated with the given member, each of the activities being at least one of a product page view activity or a user action activity associated with the given member, the chronological sequence of steps and activities including one or more specific steps and activities and one or more preceding steps and activities, the one or more specific steps and activities being subsequent to the one or more preceding steps and activities, the generating further comprising:
grouping one or more sequential page views of one of the products described in the online session log data for the given member into a product page view activity in the user sequence flow information associated with the given member, the one or more sequential page views being by the given member, and grouping one or more sequential user actions performed in conjunction with one of the products described in the online session log data for the given member into a user action activity in the user sequence flow information associated with the given member, the one or more sequential user actions being performed by the given member;

combining a plurality of user sequence flow information for the plurality of members;

identifying, for each specific step in the combined user sequence flow information, and for each preceding activity in a preceding step in the combined user sequence flow information, a portion of the combined user sequence flow information that identify a given activity at the specific step subsequent to the preceding activity in the preceding step; and generating, and displaying, in a user interface, a visual representation that indicates, for each specific step in the combined user sequence flow information, and for each preceding activity in the preceding step in the combined user sequence flow information, the identified portions.

8. The system of claim 7, wherein the operations further comprise:

receiving, via the user interface, a user specification of context information describing a particular context;

wherein the accessing further comprises accessing online session log data describing user sessions associated with the particular context.

9. The system of claim 8, wherein the context information indicates online sessions associated with a particular device type, a particular operating system type, a particular time, a particular geographic location, or a particular session-type corresponding to an organic session type or a transactional session type.

10. The system of claim 7, wherein the products include at least one of a homepage, a content feed webpage, a member profile webpage, people you may know (PYMK) webpage, a who's-viewed-my-profile (WVMP) webpage, a group profile webpage, a company profile webpage, an educational institution profile webpage, an Influencer profile webpage, a jobs webpage, a news webpage, a search webpage, a profile edit webpage, or a message inbox webpage.

11. The system of claim 7, wherein the user actions include at least one of sending an invite request to a member or a guest of the OSNS, accepting an invite request, performing a profile edit task, liking content, commenting on content, sharing content, submitting a search request, sending a message, joining a group, following a company, following an Influencer, following an educational institution, applying for a job, or uploading an address book.

12. The system of claim 7, wherein the given activity is a drop-off user action activity.

13. A non-transitory machine-readable storage medium comprising instructions that, when executed by one or more hardware processors of a machine, cause the machine to perform operations comprising:

accessing online session log data associated with a set of members of an online social network service (OSNS), the online session log data indicating, for a given member of a plurality of members of the OSNS, a chronological sequence of page views of products by the given member and user actions performed by the given member in conjunction with the products of the OSNS;

generating, for the given member, based on the online session log data, user sequence flow information indicating a chronological sequence of steps and activities associated with the given member, each of the activities being at least one of a product page view activity or a user action activity associated with the given member, the chronological sequence of steps and activities including one or more specific steps and activities and one or more preceding steps and activities, the one or more specific steps and activities being subsequent to the one or more preceding steps and activities, the generating further comprising:

grouping one or more sequential page views of one of the products described in the online session log data for the given member into a product page view activity in the user sequence flow information associated with the given member, the one or more sequential page views being by the given member, and grouping one or more sequential user actions performed in conjunction with one of the products described in the online session log data for the given member into a user action activity in the user sequence flow information associated with the given member, the one or more sequential user actions being performed by the given member;

combining a plurality of user sequence flow information for the plurality of members;

identifying, for each specific step in the combined user sequence flow information, and for each preceding activity in a preceding step in the combined user sequence flow information, a portion of the combined user sequence flow information that identify a given activity at the specific step subsequent to the preceding activity in the preceding step; and generating, and displaying, in a user interface, a visual representation that indicates, for each specific step in the combined user sequence flow information, and for each preceding activity in the preceding step in the combined user sequence flow information, the identified portions.

14. The non-transitory machine-readable storage medium of claim 13, wherein the operations further comprise receiving, via the user interface, a user specification of context information describing a particular context;

wherein the accessing further comprises accessing online session log data describing user sessions associated with the particular context.

15. The non-transitory machine-readable storage medium of claim 14, wherein the context information indicates online sessions associated with a particular device type, a particular operating system type, a particular time, a particular geographic location, or a particular session-type corresponding to an organic session type or a transactional session type.

16. The non-transitory machine-readable storage medium of claim 13, wherein the user actions include at least one of sending an invite request to a member or a guest of the OSNS, accepting an invite request, performing a profile edit task, liking content, commenting on content, sharing content, submitting a search request, sending a message, joining a group, following a company, following an Influencer, following an educational institution, applying for a job, or uploading an address book.

17. The non-transitory machine-readable storage medium of claim 13, wherein the given activity is a drop-off user action activity.

* * * * *

UNITED STATES PATENT AND TRADEMARK OFFICE
CERTIFICATE OF CORRECTION

PATENT NO. : 9,848,053 B2
APPLICATION NO. : 14/587567
DATED : December 19, 2017
INVENTOR(S) : Chen et al.

Page 1 of 1

It is certified that error appears in the above-identified patent and that said Letters Patent is hereby corrected as shown below:

On the Title Page

In item (71), in "Applicant", in Column 1, Lines 1-2, delete "LinkedIn Corporation, Mountain View, CA (US)" and insert --Microsoft Technology Licensing, LLC, Redmond, WA (US)-- therefor Signed and Sealed this
Twenty-eighth Day of May, 2019

Andrei Iancu
*Director of the United States Patent and Trademark Office*